UNITED STATES PATENT OFFICE.

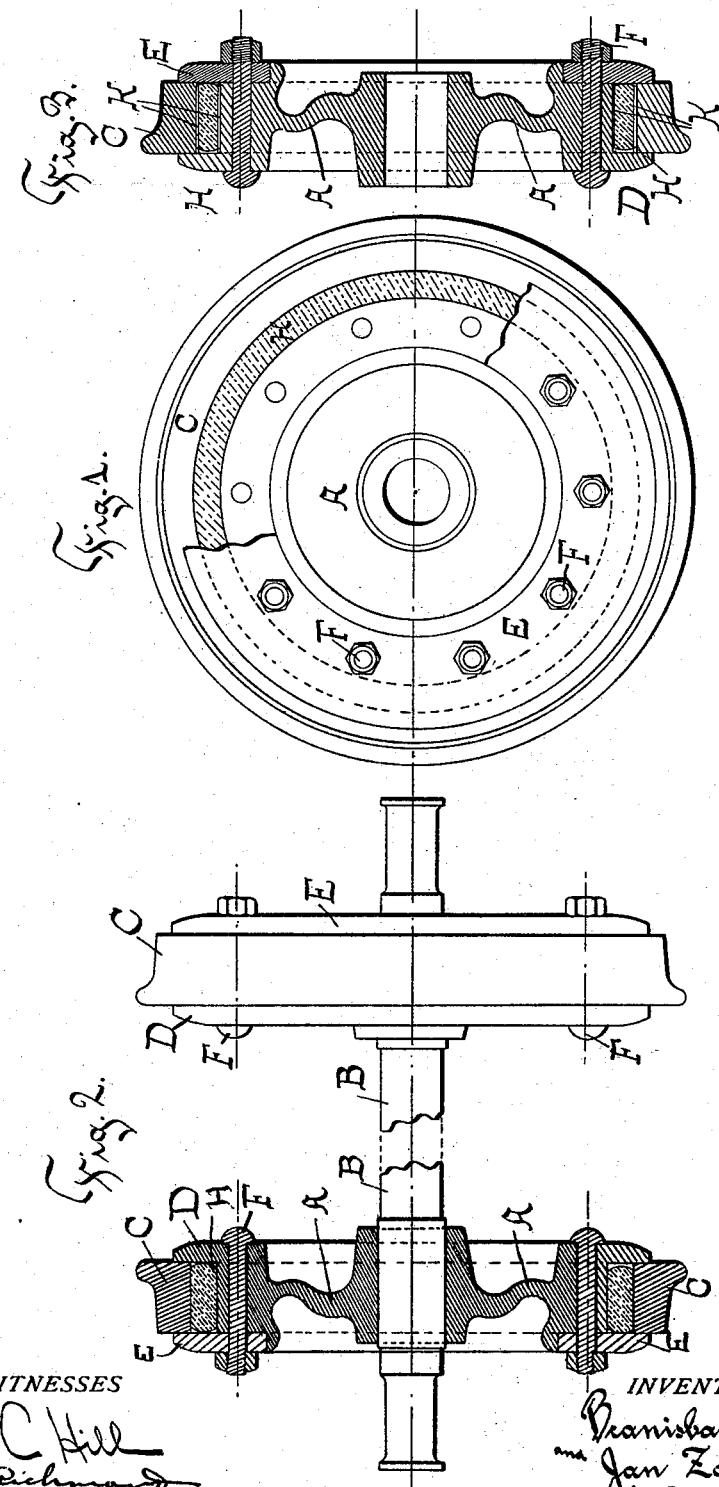

BRONISTAW TUROWSKI AND IAN ZARSKI, OF WARSAW, RUSSIA.

CAR-WHEEL.

SPECIFICATION forming part of Letters Patent No. 637,684, dated November 21, 1899.

Application filed May 10, 1898. Serial No. 680,313. (No model.)

*To all whom it may concern:*

Be it known that we, BRONISTAW TUROWSKI and IAN ZARSKI, subjects of the Emperor of Russia, residing at Warsaw, Poland, Russia, have invented certain new and useful Improvements in Car-Wheels; and we do hereby declare the following to be a full, clear, and exact description of the invention, such as will enable others skilled in the art to which it appertains to make and use the same.

The present invention relates to the construction of car-wheels and the like; and its object is to provide such wheels with an elastic body, such as an elastic ring or cushion, whereby the jolting and jarring of the car are reduced to a minimum.

To this end the invention consists in certain novel features in the construction, arrangement, and combination of the component parts of a car-wheel, as hereinafter more fully set forth, and particularly pointed out in the claim.

In the accompanying drawings, forming part of this specification, Figure 1 is a side view of a car-wheel embodying our invention, part of the ring E being removed to more clearly show the elastic cushion H. Fig. 2 shows in vertical section and elevation, respectively, two car-wheels mounted on a common axle. Fig. 3 shows in vertical section a modified form of the car-wheel.

Similar letters of reference denote corresponding parts throughout the several views.

The rim A of the wheel, which may be of any suitable type, is provided on one side with a peripheral flange D and at the other side with a metal ring or plate E, both coacting to retain the tire C and incidentally forming, with the rim, an annular passage to receive an elastic ring or cushion H. This cushion may be made in any suitable and preferred form, either as a single endless belt or otherwise, as circumstances may demand.

Our improved wheel may be mounted as follows: The elastic ring or cushion H having been secured in position, the tire C is fitted over the same and movably retained thereon by means of the annular plate E, secured to the rim A opposite the flange D, to which it corresponds, said rim A having an annular projection or bearing-surface upon which the plate or ring E is mounted. Bolts F, passing through the flange, rim, and plate, serve to clamp the latter upon the rim.

The cushion H may be made of one or several layers of rubber or of any other suitable compressible and elastic material. The annular space in which the cushion is seated being entirely closed off from the outside, the little air that may be inclosed with the cushion can exert no destructive influence on the cushion (when rubber or the like material is employed in the form of superposed layers) nor detract from the effectiveness of the latter. However, care should be taken that the cushion does not press tightly against the tire C, as the latter should always be in a position to turn.

When rounding curves, friction often occurs, as is well known, by reason of the difference in distances at which the wheels mounted on a common axle are compelled to run. This friction, however, and the vibrations necessarily resulting therefrom are entirely obviated by the present invention. The tire, as already mentioned, being movably retained on the rim is free to turn independently thereof.

Should the inner periphery of the tire become rusty by reason of the presence of humidity, a brown layer of oxid or rust will form on the rubber, the oxid combining with the sulfur contained in the rubber. While this coating is of no significance as regards the further use of the wheels, yet its presence can be easily avoided by interposing between the cushion and the rim and tire, as shown in Fig. 3, thin annular strips K K of brass or any other suitable material that is sufficiently hard and rust-proof.

The violent jolting so disagreeable to passengers can be directly traced as resulting from vibrations in a cross direction, in longitudinal direction, and in vertical direction, experiments having shown that the latter have a most detrimental effect on the health of travelers and are also the most occurrent. These concussions increase naturally with the increase in speed of the train, so that it is not unusual that three hundred vertical jolts or shocks occur per minute. In this regard the great advantage of having these concussions removed or decreased by the arrangement described cannot be doubted.

It may be further remarked that any system of brakes now in general use is applicable to our improved car-wheel.

It is obvious that various changes and modifications may be made without sacrificing any of the essential features of the invention. Hence we do not limit ourselves to the precise form of car-wheel shown and described, but consider ourselves entitled to all such changes and modifications as fall within the spirit and scope of our invention.

We claim—

In a car-wheel, in combination with a rim provided at one side with a peripheral flange, an elastic cushion carried by the rim, a tire movable upon said cushion, annular plates of a suitable non-rusting material interposed between said cushion, tire and rim, and a retaining-plate adapted to prevent a lateral displacement of said tire, substantially as described.

In testimony whereof we affix our signatures in presence of two witnesses.

BRONISTAW TUROWSKI. [L. S.]
   IAN ZARSKI. [L. S.]

Witnesses:
 WLADYSLAW ZANIOWSKI,
 M. STEFAN MATERZEWSKI.